United States Patent Office
3,166,550
Patented Jan. 19, 1965

3,166,550
PROCESS FOR 14α-METHYL-11-KETOPROGESTER-
ONE AND INTERMEDIATES THEREFOR
Brian Bannister, Kalamazoo Township, Kalamazoo
County, Mich., assignor to The Upjohn Company,
Kalamazoo, Mich., a corporation of Delaware
No Drawing. Filed July 27, 1962, Ser. No. 213,027
15 Claims. (Cl. 260—239.55)

This invention relates to novel processes for the preparation of steroids and is more particularly concerned with novel syntheses of 14α-methyl-11-ketoprogesterone and novel steroids produced as intermediates in said syntheses.

The compound 14α-methyl-11-ketoprogesterone is a valuable intermediate in the preparation of 14α-methylcortisone, 14α-methylhydrocortisone and related compounds as described in U.S. Patent 2,813,111. Hitherto 14α-methyl-11-ketoprogesterone has only been available by degradation of lanosterol (in which the 14α-methyl group is already present) using a lengthy procedure; see, for example, U.S. Patent 2,782,212. Further lanosterol itself, which is obtained from sheep wool fat, is difficult to obtain free from closely related compounds thus adding to the difficulty of obtaining adequate supplies of 14α-methyl-11-ketoprogesterone.

The present invention makes available for the first time a convenient and economically attractive route to 14α-methyl-11-ketoprogesterone from readily available starting materials.

The present invention, in one of its major aspects, consists in a process for the preparation of 14α-methyl-11-ketoprogesterone from the readily available starting material, 15α-hydroxypregn-4-ene-3,11,20-trione. The reaction steps involved in this process are set forth schematically below:

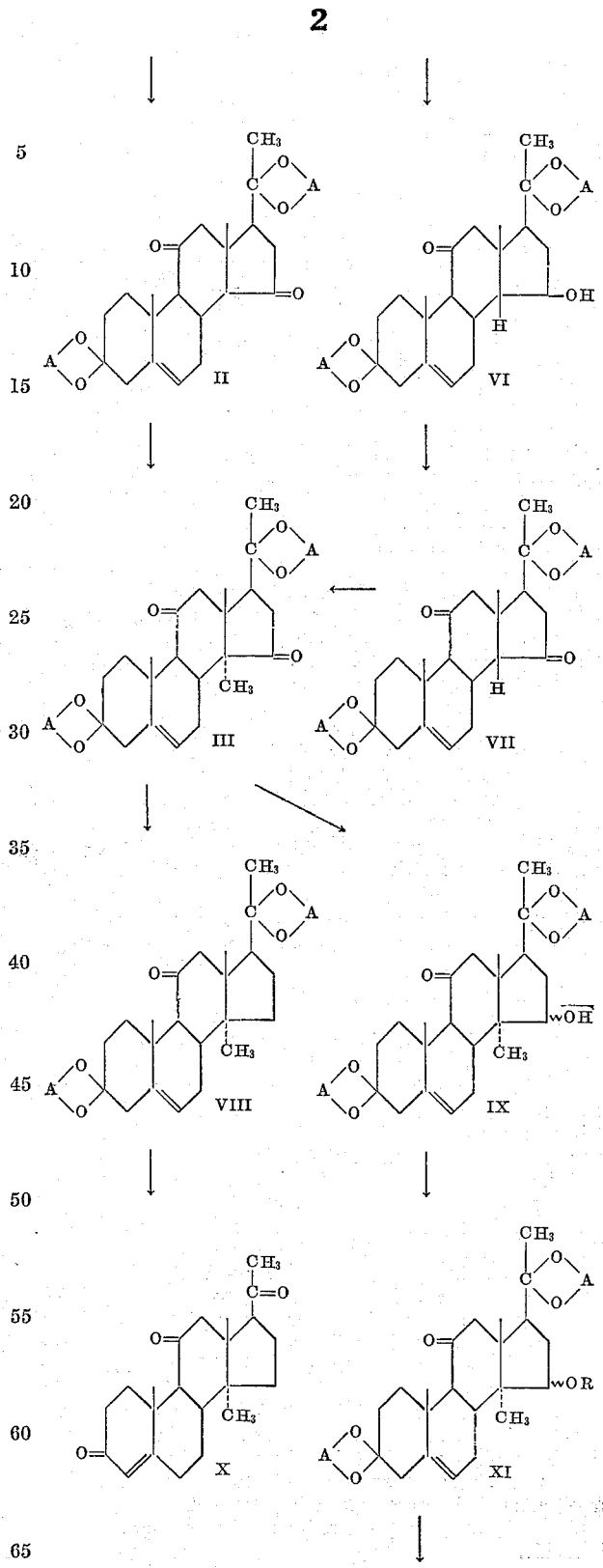

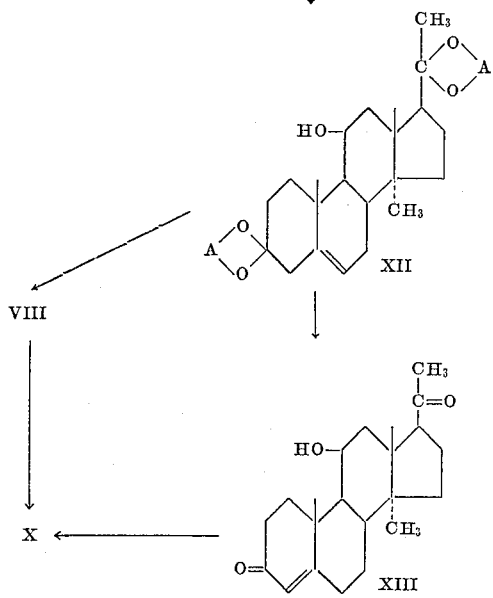

In the above formulae, A is an alkylene radical containing from 2 to 6 carbon atoms, inclusive, wherein the attaching oxygen to carbon bonds are separated by a chain of at least 2 and not more than 3 carbon atoms, such as ethylene, propylene, dimethylpropylene and the like, and R is the radical of an alkylsulfonic acid such as methanesulfonic acid, ethanesulfonic acid, and the like, or an arylsulfonic acid such as benzenesulfonic acid, toluenesulfonic, xylenesulfonic acid, and the like. The wavy line, when used in the above formula and throughout the specification, is a generic expression indicating the α- or β-configuration or mixtures thereof.

In the process of the invention, the conversion of 15α-hydroxy-11-ketoprogesterone via its 3,20-bisketal (I) to the corresponding 3,20-bisketal of 11,15-diketoprogesterone (III) can take alternative routes as follows. In the preferred alternative, 15α-hydroxy-11-ketoprogesterone 3,20-bisketal (I), prepared by reacting 15α-hydroxy-11-ketoprogesterone with the appropriate glycol

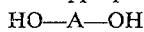

wherein A has the significance hereinbefore defined, according to conventional procedures for the preparation of ketals (see, for example, U.S. Patent 2,968,655, Preparation 2), is first oxidized to give the corresponding 11,15-diketoprogesterone 3,20-bisketal (II). The oxidation is effected using oxidizing agents such as chromic acid, sodium dichromate, and the like, using procedures well-known in the art for the oxidation of steroid secondary alcohols to the corresponding ketones. The oxidation is advantageously effected at temperatures within the range of about 0° C. to about 30° C. The desired compound (II) is isolated from the extraction mixture by conventional procedures, for example, by dilution with water, followed by solvent extraction, and is purified by recrystallization, chromatography, or the like.

The 11,15-diketoprogesterone 3,20-bisketal (II) can be deketalized to yield 11,15-diketoprogesterone by hydrolysis with strong mineral acid in aqueous acetone, aqueous methanol, and the like media.

The 11,15-diketoprogesterone 3,20-bisketal (II) obtained above is methylated by reaction with a methyl halide, preferably methyl iodide, in the presence of a base. Advantageously the base employed in the reaction is an alkali metal salt, i.e., the sodium, potassium, or lithium salt, of a lower aliphatic alcohol such as methanol, ethanol, isopropyl alcohol, butanol, t-butyl alcohol and the like. The preferred base is potassium tert.-butoxide.

The reaction is carried out in the presence of an inert organic solvent, i.e., an organic solvent which does not interfere with the course of the reaction. Advantageously where the base employed in the reaction is an alkali metal derivative of a lower aliphatic alcohol, said alcohol is also used as reaction solvent, the alkali metal derivative of the alcohol being formed in situ. Thus where the base is potassium t-butoxide, t-butyl alcohol is preferably employed as reaction solvent, the potassium t-butoxide being generated by dissolving the requisite quantity of potassium in an excess of t-butanol, the remainder of the reactants being added to the solution so obtained.

The reaction is preferably conducted at or near room temperature, i.e., within the range of about 0° C. to about 35° C. Advantageously the reaction is carried out in the presence of an inert gas such as nitrogen.

The desired product, namely, the 3,20-bisketal of 14α-methylpregn-4-ene-3,11,15,20-tetrone (III) is isolated from the reaction mixture by conventional procedures, for example, the reaction mixture is filtered to remove alkali metal halide, the filtrate is evaporated to dryness and the residue is subjected to solvent extraction. Purification of the compound (III) so obtained is accomplished by recrystallization and like conventional procedures.

If the above alkylation of (II) is carried out in the presence of an inert solvent other than an aliphatic alcohol, for example, a non-polar solvent such as an aliphatic or aromatic hydrocarbon, e.g., benzene, toluene, xylene, and the like, there is obtained a mixture of the desired compound (III) and the 3,20-bisketal of 15-methoxy-14α-methylpregna-4,15-diene-3,11,20-trione (IIIA). This mixture can be separated into its components by chromatography, fractional crystallization, counter-current distribution, or like procedures or any combination of such procedures. The 15-methoxy derivative (IIIA) so obtained can be converted to the desired compound (III) by partial hydrolysis under weakly acidic conditions, for example, by treatment with oxalic acid in aqueous medium such as aqueous methanol, aqueous ethanol, aqueous tetrahydrofuran and the like.

The compounds (III) and (IIIA) obtained as described above can be deketalized, for example, by hydrolysis with mineral acid in aqueous acetone, aqueous methanol, aqueous ethanol, or like medium, to produce 14α-methylpregn-4-ene-3,11,15,20-tetrone.

In an alternative method of proceeding from compound (I) to compound (III), the former is reduced using lithium aluminum hydride, sodium borohydride, and like reducing agents, in the presence of an inert organic solvent such as tetrahydrofuran, ether, dioxan, and the like, to obtain 11β,15α-dihydroxyprogesterone 3,20-bisketal (IV). The reduction is carried out according to conventional procedure, such as that described by Levin, J. Am. Chem. Soc. 76, 546 (1954).

The compound (IV) so obtained can be deketalized by mineral acid hydrolysis as described above to obtain 11β,15α-dihydroxypregn-4-ene-3,20-dione.

The 15α-hydroxy group of the compound (IV) can be oxidized selectively without effect upon the 11β-hydroxy group by subjecting (IV) to Oppenauer oxidation using procedures known in the art, for example, using aluminum tert.-butoxide and acetone or cyclohexanone in the presence of an anhydrous organic solvent such as toluene, benzene, petroleum ether, dioxane, and the like, or mixtures thereof. There is thus obtained the 3,20-bisketal of 11β-hydroxypregn-4-ene-3,15,20-trione (V) which is isolated from the reaction mixture using conventional procedures, for example, by decomposition with water followed by solvent extraction, and is purified by recrystallization, chromatography or by a combination of these or like conventional procedures.

The compound (V) can be deketalized by mineral acid hydrolysis as described above to obtain 11β-hydroxypregn-4-ene-3,15,20-trione.

The compound (V) obtained as described above can be isomerized in the presence of base to give the 3,20-bisketal of 15β-hydroxy-14β-pregn-4-ene-3,11,20-trione (VI). This isomerization is a novel transformation for which no parallel in the steroid art is known. Bases which can be employed in the isomerization include alkali metal hydroxides such as potassium hydroxide, sodium hydroxide, and the like and alkali metal alkoxides such as potassium methoxide, sodium methoxide, potassium t-butoxide and the like. The isomerization is carried out in the presence of an inert organic solvent such as dioxan or lower-aliphatic alcohols such as methanol, ethanol, isopropyl alcohol, butanol, and the like. The isomerization is preferably conducted in an inert atmosphere, for example, under nitrogen and can be conducted at temperatures within the range of about 0° C. to about the boiling point of the solvent.

The desired compound (VI) is isolated from the reaction mixture by conventional procedures, for example, by diluting the reaction mixture with water and then subjecting to solvent extraction. Purification of (VI) can be achieved by recrystallization and like conventional procedures.

The compound (VI) can be deketalized by mineral acid hydrolysis as described above to obtain 15β-hydroxy-14β-pregn-4-ene-3,11,20-trione.

The compound (VI) can be oxidized to the corresponding 11,15-dione (VII) using oxidizing agents such as chromic acid, sodium dichromate, and the like, according to conventional procedures such as those described above for the oxidation of (I) to (II).

The compound (VII) so obtained can be deketalized by mineral acid hydrolysis as described above to obtain 14β-pregn-4-ene-3,11,15,20-tetrone.

The compound (VII) can be subjected to alkylation using the procedures described above for the conversion of (II) to (III), and is thereby converted to the compound (III). Alternatively the compound (VII) can be isomerized to the corresponding 11,15-dione (II) by treatment with a base, for example, an alkali metal hydroxide such as sodium hydroxide, potassium hydroxide or the like, or an alkali metal alkoxide such as potassium methoxide, sodium methoxide and the like. The isomerization is conducted in the presence of an inert organic solvent such as dioxan, tetrahydrofuran or a lower alkanol, for example, methanol, ethanol and the like. The isomerization is advantageously carried out with the range of about 20° C. to about the boiling point of the solvent employed. The compound (II) so obtained is then converted to the compound (III) using the procedure hereinbefore described.

The compound (III), obtained by either of the above-described routes, can be converted to the desired compound 14α-methyl-11-ketoprogesterone (X) using either of the following alternative procedures:

According to the first alternative route the compound (III) is reduced directly to the 15-desoxy compound (VIII) which is then deketalized by mineral acid hydrolysis under the conditions described above, to yield the desired compound (X). The reduction of compound (III) is effected by Wolff-Kishner reduction using the procedure described by Huang-Minlon, J. Am. Chem. Soc. 68, 2487, 1046; ibid 71, 3301, 1949.

In the second alternative procedure the 15-keto group of the compound (III) is selectively reduced to give the corresponding 15-hydroxy compound (IX). The reduction is effected using an alkali metal borohydride such as potassium borohydride, sodium borohydride, and the like, in solution in an inert organic solvent such as dioxan, tetrahydrofuran, a lower aliphatic alcohol such as methanol, ethanol, isopropyl alcohol, and the like, or mixtures of these solvents with water. The reaction is preferably conducted at or about room temperature (25° C.). The desired product (IX) is isolated from the reaction mixture by conventional procedures, for example, by acidification followed by evaporation of the organic solvent and filtration of the resulting slurry. The product so obtained is generally a mixture of the 15α- and 15β-epimers of the compound (IX) which mixture can be separated by chromatography, fractional crystallization, and like conventional procedures.

Either of the so purified epimers of (IX) or the mixtures thereof, without separation of the two epimers, can be deketalized using mineral acid hydrolysis using the procedure described above to give the corresponding 14α-methyl-15(α or β)-hydroxy-4-pregnene-3,11,20-trione.

The mixture of epimers of (IX) or either of the individual epimers alone can be converted to the corresponding 15-sulfonacylated derivative (XI) by reaction with the appropriate alkylsulfonyl halide or arylsulfonyl halide in the presence of a tertiary amine such as pyridine using conventional sulfonacylation procedures.

The compound (XI) so obtained (the α- or β-epimer or mixtures thereof) is then subjected to hydrogenolysis using lithium aluminum hydride or like reducing agents in the presence of an inert organic solvent such as tetrahydrofuran, dioxan, and the like. The reduction is conducted advantageously at a temperature within the range of about 0° C. to about the boiling point of the reaction solvent. The desired compound (XII) is isolated from the reaction mixture by conventional procedures, for example, by decomposing the excess reducing agent suitably by the addition of an ester such as ethyl acetate followed by isolation and evaporation of the organic phase. The compound (XII) can be purified by conventional procedures such as recrystallization, chromatography, and the like.

Deketalization of the compound (XII) using mineral acid hydrolysis as described above affords 14α-methyl-11β-hydroxyprogesterone which is then oxidized using chromic acid, sodium dichromate, and like oxidizing agents under reaction conditions described above to yield the desired compound (X). Alternatively, the steps of deketalization and oxidation can be reversed, i.e., the compound (XII) is first oxidized to the compound (VIII) and the latter is then deketalized to yield the desired compound (X).

The 3,20-bisketals (III), (IV), (V), (VI), (VII), (VIII), (IX), and (XI), and the corresponding 3,20-diones obtained therefrom, namely, 14α-methylpregn-4-ene-3,11,15,20 - tetrone, 11β,15α-dihydroxypregn-4-ene - 3,20-dione, 11β-hydroxypregn-4-ene - 3,15,20 - trione, 15β - hydroxy-14β-pregn-4-ene-3,11,20-trione, 14β-pregn - 4 - ene-3,11,15,20-tetrone, 14α-methylpregn-4-ene-3,11,20-trione, 15(α or β)-hydroxy-14α-methylpregn-4-ene - 3,11,20 - trione, and 15(α or β)-sulfonacyloxy-14α-methylpregn-4-ene-3,11,20-trione, are novel compounds which, in addition to their usefulness as intermediates in the above-described process, possess useful physiological and pharmacological properties. Illustratively the above named compounds exhibit progestational activity which makes them useful as oral and parenteral progestational agents in the same manner as is conventional for the use of progesterone. The above-named compounds also possess central nervous system depressant activity which makes them useful as sedatives and general anesthetics in mammals. For example, the above-named compounds can be used as sedatives and anesthetics in the laboratory manipulation of experimental animals such as mice and rats. The above-named compounds also exhibit anti-aldosterone and mineralo-regulatory activity.

The above-named compounds can be prepared and administered to birds and mammals, including valuable domestic animals, in a wide variety of oral or parenteral dosage forms singly, or in admixture with other active compounds. They can be associated with a pharmaceutical carrier which can be solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

The present invention also includes, in a further aspect, an alternative procedure for the conversion of the compound (I) to the compound (X). This alternative procedure is illustrated by the following reaction scheme:

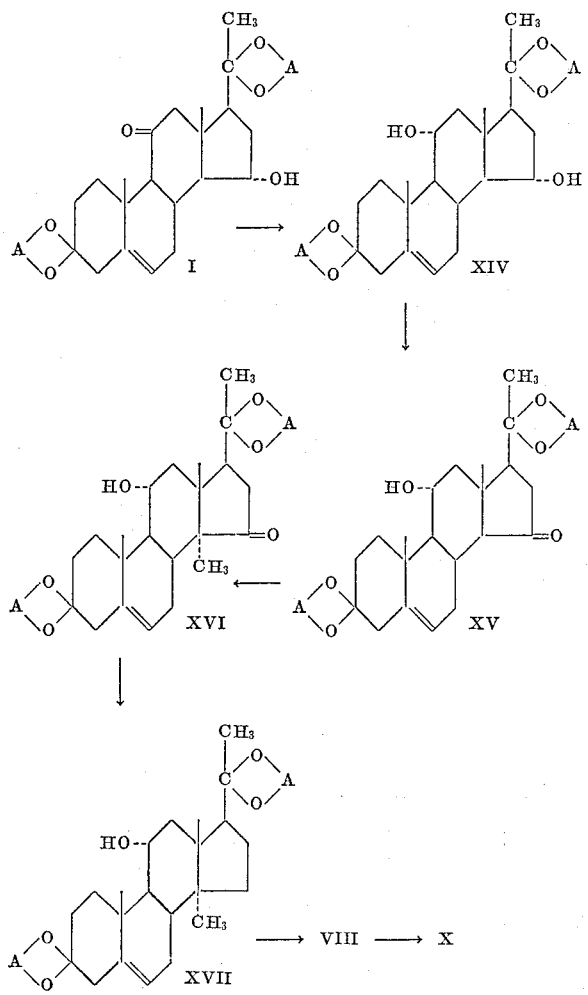

In the above formulae, A has the significance hereinbefore defined.

In accordance with the above procedure the compound (I) is reduced using sodium and a lower alkanol in the presence of liquid ammonia to give the corresponding 11α,15α-dihydroxy compound (XIV). Advantageously the reduction is carried out by slowly adding a solution of the compound (I) in a lower alkanol, preferably ethanol, and an inert organic solvent such as dioxan, tetrahydrofuran, and the like, to an excess of liquid ammonia. Sodium metal, in calculated quantity, is added portionwise to the resulting mixture. The excess ammonia is then allowed to evaporate and the desired product (XIV) is isolated from the reaction mixture by conventional procedures, for example, by diluting the reaction mixture with water and then subjecting the mixture to solvent extraction. The product (XIV) so obtained can be purified by conventional procedures, for example, by recrystallization, chromatography, and the like.

Deketalization of (XIV) by mineral acid hydrolysis using the procedures hereinbefore described yields 11α, 15α-dihydroxypregn-4-ene-3,20-dione.

The compound (XIV) can be oxidized using the Oppenauer conditions as described above to obtain the corresponding 11α-hydroxy-15-keto compound (XV). The latter compound can also be prepared by reduction of the compound (VI) described above using sodium and a lower alkanol in the presence of liquid ammonia under the conditions described above, to yield 11α-15β-dihydroxy-14β-pregn-4-ene-3,20-dione, 3,20-bisketal which latter is then oxidized under Oppenauer conditions to (XV).

The compound (XV) can be deketalized using mineral acid hydrolysis as hereinbefore described in yield 11α-hydroxypregn-4-ene-3,15,20-trione.

The compound (XV) is then alkylated using a methyl halide under the conditions hereinbefore described for the conversion of (II) to (III), to obtain the corresponding 14α-methyl compound (XVI). The latter compound can be deketalized using mineral acid hydrolysis as hereinbefore described to yield 11α-hydroxy-14α-methylpregn-4-ene-3,15,20-trione.

In the final steps of the alternative procedure, the compound (XVI) is subjected to reduction under Huang-Minlon conditions as hereinbefore described for the conversion of compound (III) to compound (VIII). The compound (XVII) so obtained is then oxidized using chromic acid, sodium dichromate, and like oxidizing agents under conditions hereinbefore described to obtain compound (VIII) which is then deketalized as described previously to obtain the desired 14α-methyl-11-ketoprogesterone (X).

The compounds (XIV), (XV), (XVI) and (XVII), and the free 3,20-diones obtained therefrom, namely, 11α,15α-dihydroxypregn-4-ene-3,20-dione, 11α-hydroxypregn-4-ene-3,15,20-trione, 11α - hydroxy - 14α-methylpregn-4-ene-3,15,20-trione, and 11α-hydroxy-14α-methylpregn-4-ene-3,20-dione, in addition to their usefulness as intermediates in the above-described process, possess useful physiological and pharmacological properties. Illustratively, the above-named compounds exhibit progestational activity which makes them useful as oral and parenteral progestational agents in the same manner as is conventional for the use of progesterone. The above-named compounds possess central nervous system depressant activity which makes them useful as sedatives and general anesthetics in mammals. For example, the above-named compounds can be used as sedatives and anesthetics in the laboratory manipulation of experimental animals such as mice and rats. The above-named compounds also exhibit anti-aldosterone and mineralo-regulatory activity.

The above-named compounds can be prepared and administered to birds and mammals, including valuable domestic animals, in a wide variety of oral or parenteral dosage forms as described above for the compounds (III), (IV), (V), (VI), VII), (VIII), (IX) and (XI), and the corresponding free 3,20-diones.

The following preparations and examples are illustrative of the process and products of the present invention, but are not to be construed as limiting.

PREPARATION 1

*15α-hydroxy-11-ketoprogesterone*

A medium was prepared of 10 g. of Cerelose (dextrose), 20 g. of corn steep liquor, and 1,000 ml. of water and adjusted to a pH between 5.5 and 6. Twelve liters of this sterilized medium was inoculated with spores of *Penicillium urticae* ATCC 10120 and incubated for a period of 24 hours at a temperature of 26° C., using a rate of aeration and stirring such that the oxygen uptake was 13 millimoles per hour per liter of $Na_2SO_3$, according to the method of Cooper, Fernstrom and Miller, Ind. Eng. Chem. 36, 504 (1944). To this medium containing a 24-hour growth of *Pencillium urticae* was added 2 g. of 11-ketoprogesterone, dissolved in 100 ml. of acetone. After an additional 24-hour period of incubation under the same conditions of temperature and aeration, the beer and mycelium were separated. The mycelium was filtered, washed twice, each time with a volume of acetone approximately equal to the volume of the mycelium, and extracted twice, each time with a volume of methylene chloride approximately equal to the volume of the mycelium. The acetone and methylene chloride extracts, including solvent, were added to the beer filtrate and the combined extracts and beer filtrates were extracted successively with two one-half by volume portions of methylene chloride and then with two one-fourth by volume portions of methylene chloride. The methylene chloride extracts were washed with two one-tenth by volume portions of a 2 percent aqueous solution of sodium bicarbonate and then with two one-tenth by volume portions of water. After drying the methylene chloride extracts with anhydrous sodium sulfate and filtering, the solvent was distilled from the filtrate. The residue thus obtained was recrystallized twice from acetone and ether in 1 to 1 ratio and once from acetone and Skellysolve B to give 15α-hydroxy-11-ketoprogesterone having a melting point of 227 to 229° C., $[\alpha]_D^{20}$ +257° (in EtOH).

EXAMPLE 1
*3,20-bis-(ethylene ketal) of 15α-hydroxy-4-pregnene-3,11,20-trione*

A mixture of 4.75 g. of 15α-hydroxy-11-ketoprogesterone, 100 ml. of benzene, 5 ml. of ethylene glycol and 0.1 g. of paratoluenesulfonic acid was heated under reflux with stirring under a water trap for hours. The mixture was then cooled and the product crystallized. The acid was neutralized by the addition of 10 ml. of saturated sodium bicarbonate solution and the mixture stirred for 15 minutes. The crystalline precipitate was removed by filtration and oven-dried. The product was recrystallized from acetone containing a drop of pyridine, to yield 2 g. of crystals melting at 248 to 250° C. A second crop furnished 0.80 g. The original filtrate was evaporated and this residue and also the second crop were recrystallized to yield an additional 1.12 g. of the 3,20-bis(ethylene ketal) of 15α-hydroxy-4-pregnene-3,11,20-trione and having a melting point of 246 to 248° C.

*Anal.*—Calcd. for $C_{25}H_{36}O_6$: C, 69.42; H, 8.59. Found: C, 69.41; H, 8.42.

$[\alpha]_D$ +62° (acetone):

$\lambda_{max.}^{Nujol}$ 3530, 1695, 1100 cm.$^{-1}$

In the same manner as shown in Example 1, but replacing ethylene glycol by other 1,2-alkanediols or 1,3-alkanediols having the formula HO—A—OH, wherein A has the significance hereinbefore defined, there are obtained the corresponding 3,20-bisketals of 15α-hydroxypregn-4-ene-3,11,20-trione such as the 3,20-bis(2,2-dimethyl-1,2-propylene ketal, 2,30-bis(1,2 - propylene ketal), 3,20-bis(1,3-butylene ketal) and the like.

EXAMPLE 2
*3,20-bis(ethylene ketal) of pregn-4-ene-3,11,20-tetrone*

A solution of 5.0 g. of 15α-hydroxy-11-ketoprogesterone 3,20-bis(ethylene ketal) in 50 ml. of pyridine was added to a solution of 5 g. of chromium trioxide in 50 ml. of pyridine. The reaction mixture was allowed to stand overnight before being diluted with 300 ml. of water and extracted with methylene chloride. The solvent was removed in vacuo and the product was recrystallized from a mixture of acetone and Skellysolve B (commercial hexanes) to give 2.6 g. of pregn-4-ene-3,11,15,20-tetrone 3,20-bis(ethylene ketal) in the form of a crystalline solid having a melting point of 198 to 206° C. A sample of the material was recrystallized twice from the same solvent to give pure compound having a melting point of 208 to 210° C.; $[\alpha]_D^{20}$ —16° (acetone).

Using the same procedure but replacing 15α-hydroxy-11-ketoprogesterone 3,20-bis(ethylene ketal) by the corresponding 3,20-bis(2,2-dimethyl-1,2-propylene ketal), 3,20-bis(1,2-propylene ketal) and 3,20-bis(1,3-butylene ketal), there are obtained the 3,20-bis(2,2-dimethyl-1,2-propylene ketal), 3,20-bis(1,2-propylene ketal) and 3,20-bis(1,3-butylene ketal), respectively, of pregn-4-ene-3,11,15,20-tetrone.

EXAMPLE 3
*3,20-bis(ethylene ketal) of 14α-methylpregn-4-ene-3,11,15,20-tetrone*

A solution of potassium tert.-butoxide was prepared from 44.5 g. of potassium and 1300 ml. of tert.-butyl alcohol. To this solution, under an atmosphere of nitrogen, was added with stirring 9.77 g. of pregn-4-ene-3,11,15,20-tetrone 3,20-bis(ethylene ketal) and the mixture so obtained was stirred for 1 hr. at approximately 25° C. To the resulting mixture (cooled to 10° C.) was added 142 ml. of methyl iodide and the mixture so obtained was stirred for several hours at approximately 25° C. The solid which had separated was isolated by filtration, and washed well with tert.-butyl alcohol. The filtrate was evaporated to dryness at 40° C. under reduced pressure. The residue was treated with water and the aqueous mixture was extracted thoroughly with methylene chloride. The methylene chloride extracts were combined, washed with water, and dried over anhydrous sodium sulfate. The dried solution was filtered and the filtrate was evaporated to dryness at 30° C. under reduced pressure. The residue (11.69 g.) was dissolved in 200 ml. of warm benzene, the solution obtained was diluted with 600 ml. of Skellysolve B and the resulting mixture was concentrated at room temperature under a stream of nitrogen. The solid which separated was isolated by filtration, washed with a mixture of benzene and Skellysolve B and dried. The material so obtained (2.82 g.; M.P. 282 to 291° C.) was recrystallized from benzene. There was thus obtained 2.68 g. of the 3,20-bis(ethylene ketal) of 14α-methylpregn-4-ene-3,11,15,20-tetrone in the form of a crystalline solid having a melting point of 298 to 300° C.; $[\alpha]_D^{20}$ +32° (chloroform).

*Anal.*—Calcd. for $C_{26}H_{36}O_6$: C, 70.25; H, 8.16. Found: C, 70.27; H, 8.10.

The infrared spectrum of the compound (mineral oil mull) exhibited maxima at 1730, 1698, 1675 sh., 1145, 1135, 1115, 1103, 1085, 1065, 1050, 1038, 1023, and 1015 reciprocal centimeters. The ultraviolet spectrum of the compound (chloroform solution) exhibited a maximum at 297 millimicrons ($a_M$=69).

Using the same procedure, but replacing the 3,20-bis (ethylene ketal) of pregn-4-ene-3,11,15,20-tetrone by the corresponding 3,20-bis(2,2-dimethyl-1,2-propylene ketal), 3,20-bis(1,2-propylene ketal), and 3,20-bis(1,3-butylene ketal), there are obtained the 3,20-bis(2,2-dimethyl-1,2-propylene ketal), 3,20-bis(1,2-propylene ketal) and 3,20-bis(1,3-butylene ketal), respectively, of 14α-methylpregn-4-ene-3,11,15,20-tetrone.

EXAMPLE 4
*3,20-bis(ethylene ketal) of 15-methoxy-14α-methylpregna-4,15-diene-3,11,20-trione*

A solution of potassium tert.-butoxide, prepared by dissolving 44.5 g. of potassium in 1300 ml. of tert.-butyl alcohol, was evaporated almost completely to dryness under reduced pressure. To the residue was added 1 liter of dry benzene and the solvent was again removed by distillation under reduced pressure. This process was repeated twice more to ensure complete removal of the tert.-butyl alcohol. To the powdery residue so obtained was added 1.5 liters of dry benzene and the mixture was stirred vigorously and heated under reflux until an opalescent solution resulted. The mixture was then cooled to 5° C. and mixed slowly, with stirring, under an atmosphere of nitrogen, with a solution of 10 g. of the 3,20-bis(ethylene ketal) of pregn-4-ene-3,11,15,20-tetrone in 145 ml. of methyl iodide. After the addition was complete, the reaction mixture was stirred for several hours at approximately 25° C. before being filtered. The filtrate was evaporated to dryness under reduced pressure at 50° C. and the residue was treated with a mixture of water and methylene chloride. The aqueous layer was separated and extracted with methylene chloride. The combined methylene chloride extracts were washed with water and dried over anhydrous sodium sulfate. The dried solution was filtered and the filtrate was evaporated to dryness. The residue (11.56 g.) was dissolved in methylene chloride and chromatographed on a column of magnesium silicate (Florisil). The column was eluted with Skellysolve B containing increasing proportions of acetone and those fractions which, on the basis of paper chromatographic and infrared absorption analysis, were found to contain the desired products were combined and evaporated to dryness to obtain the following materials.

(A) 7.74 g. of the 3,20-bis(ethylene ketal) of 15-methoxy-14α-methylpregn-4,15-diene-3,11,20-trione in the form of a crystalline solid which, after recrystallization from acetone-Skellysolve B had a melting point of 201 to 203° C. An analytical sample having a melting point of 202 to 204° C. was obtained by further recrystallization from the same solvent mixture.

Anal.—Calcd. for $C_{27}H_{38}O_6$: C, 70.70; H, 8.35; $OCH_3$, 6.33. Found: C, 71.10; H, 9.04; $OCH_3$, 6.91.

The infrared spectrum of the compound (mineral oil mull) exhibited maxima at 1704, 1675, 1662, 1655 sh., 1230, 1212, 1165, 1150, 1126, 1090, 1083, 1050, 1032, 1022 and 1007 reciprocal centimeters.

(B) 0.893 mg. of the 3,20-bis(ethylene ketal) of 14α-methylpregn-4-ene-3,11,15,20-tetrone which after recrystallization from acetone had a melting point of 300 to 302.5° C., undepressed by admixture with an authentic sample.

Using the above procedure, but replacing the 3,20-bis(ethylene ketal) of pregn-4-ene-3,11,15,20-tetrone by the corresponding 3,20-bis(2,2-dimethyl-1,2-propylene ketal), 3,20-bis(1,2-propylene ketal) and 3,20-bis(1,3-butylene ketal), there are obtained the 3,20-bis(2,2-dimethyl-1,2-propylene ketal), 3,20-bis(1,2-propylene ketal), and 3,20-bis(1,3-butylene ketal), respectively, of 15-methoxy-14α-methylpregna-4,15-diene-3,11,20-trione and 14α-methylpregn-4-ene-3,11,15,20-tetrone.

EXAMPLE 5

*3,20-bis(ethylene ketal) of 14α-methylpregn-4-ene-3,11,15,20-tetrone*

To a solution of 100 mg. of the 3,20-bis(ethylene ketal) of 15-methoxy-14α-methylpregna-4,15-diene-3,11,20-trione in 20 ml. of tetrahydrofuran at about 25° C. is added with stirring 5 ml. of aqueous N oxalic acid solution. The resulting mixture is stirred for about 2 hr. and then neutralized by the addition of sodium bicarbonate. The neutral mixture is then evaporated to dryness under reduced pressure and the residue is extracted with methylene chloride. The methylene chloride extract is dried and evaporated to dryness. The residue is recrystallized from benzene. There is thus obtained the 3,20-bis(ethylene ketal) of 14α-methylpregn-4-ene-3,11,15,20-tetrone in the form of a crystalline solid.

EXAMPLE 6

*14α-methylpregn-4-ene-3,11,15,20-tetrone*

To a solution of 200 mg. of the 3,20-bis(ethylene ketal) of 14α-methylpregn-4-ene-3,11,15,20-tetrone in 20 ml. of acetone is added a solution of 5 drops of concentrated sulfuric acid in 5 ml. of water. The mixture is allowed to stand for several hours at room temperature, after which the volatile solvent is removed under reduced pressure and the residue is extracted with methylene chloride. The methylene chloride extract is dried and evaporated to dryness and the residue is recrystallized from a mixture of acetone and Skellysolve B. There is thus obtained 14α-methylpregn-4-ene-3,11,15,20-tetrone in the form of a crystalline solid.

Similarly other 3,20-ketals such as the 3,20-bis(2,2-dimethyl-1,2-propylene ketal), 3,20-bis(1,2-propylene ketal) and 3,20-bis(1,3-butylene ketal), of 14α-methylpregn-4-ene-3,11,15,20-tetrone are hydrolyzed to yield 14α-methylpregn-4-ene-3,11,15,20-tetrone.

EXAMPLE 7

*14α-methyl-11-ketoprogesterone 3,20-bis(ethylene ketal)*

A mixture of 0.5 g. of the 3,20-bis(ethylene ketal) of 14α-methylpregn-4-ene-3,11,15,20-tetrone, 15 ml. of ethylene glycol, and 0.5 ml. of hydrazine hydrate is heated under reflux for 30 minutes, and then 1.5 ml. of saturated aqueous potassium hydroxide is added slowly with caution. The mixture so obtained is heated until the temperature reaches 210° C. after which the mixture is heated under reflux for a further 2 hrs. The resulting product is cooled and poured on to ice. The mixture so obtained is extracted several times with methylene chloride and the methylene chloride extracts are combined and washed with water before being dried over anhydrous sodium sulfate. The dried solution is filtered and the filtrate is evaporated to dryness. The residue is dissolved in methylene chloride and chromatographed on a column of magnesium silicate. The column is eluted with Skellysolve B containing increasing proportions of acetone. Those fractions of the eluate which, on the basis of paper chromatography and infrared spectrum analysis, are found to contain the desired product are combined and evaporated to dryness. The residue is recrystallized from a mixture of Skellysolve B and acetone. There is thus obtained the 3,20-bis(ethylene ketal) of 14α-methyl-11-ketoprogesterone in the form of a crystalline solid.

Using the above procedure, but replacing the 3,20-bis(ethylene ketal) of 14α-methylpregn-4-ene-3,11,15,20-tetrone by the corresponding 3,20-bis(2,2-dimethyl-1,2-propylene ketal), 3,20-bis(1,2-propylene ketal) and 3,20-bis(1,3-butylene ketal), there are obtained the 3,20-bis(2,2-dimethyl-1,2-propylene ketal), 3,20-bis(1,2-propylene ketal) and 3,20-bis(1,3-butylene ketal), respectively, of 14α-methyl-11-ketoprogesterone.

EXAMPLE 8

*14α-Methyl-11-Ketoprogesterone*

To a solution of 100 mg. of 14α-methyl-11-ketoprogesterone 3,20-bis(ethylene ketal) in 20 ml. of acetone is added a solution of 5 drops of concentrated sulfuric acid in 5 ml. of water, and the mixture so obtained is allowed to stand for several hours at about 25° C. At the end of this time, the volatile solvent is distilled under reduced pressure and the residue is extracted with methylene chloride. The methylene chloride extracts are washed with water, dried over anhydrous sodium sulfate, and filtered. The filtrate is evaporated to dryness and the residue is recrystallized from methanol. There is thus obtained 14α-methyl-11-ketoprogesterone in the form of a crystalline solid and identical in all respects with an authentic specimen of the compound.

14α-methyl-11-ketoprogesterone is also obtained by hydrolysis, using the above procedure, of the corresponding 3,20-bis(2,2-dimethyl-1,2-propylene ketal), 3,20-bis(1,2-propylene ketal) and 3,20-bis(1,3-butylene ketal).

EXAMPLE 9

*3,20-Bis(ethylene ketal) of 11β,15α-dihydroxypregn-4-ene-3,20-dione*

A solution was prepared by heating 1.65 g. of lithium aluminum hydride in dry, purified tetrahydrofuran under reflux with stirring. The solution so obtained was cooled to approximately 25° C. and then treated dropwise with stirring and cooling, with a solution of 5 g. of the 3,20-bis(ethylene ketal) of 15α-hydroxypregn-4-ene-3,11,20-trione in 120 ml. of tetrahydrofuran. When the addition was complete the reaction mixture was stirred and heated under gentle reflux to complete the reaction before being cooled in ice and treated carefully with ethyl acetate to decompose the excess lithium aluminum hydride. To the resulting mixture was added excess aqueous sodium sulfate after which the upper organic layer was isolated by decantation. The aqueous layer was extracted with ethyl acetate and the combined organic layers were evaporated to dryness under reduced pressure. The residue was dissolved in methylene chloride and the solution was washed with water, dried over anhydrous sodium sulfate and evaporated to dryness. The residue (4.85 g.) was recrystallized from acetone to give 3.9 g. of the 3,20-bis-(ethylene ketal) of 11β, 15α-dihydroxypregn-4-ene-3,20-dione in the form of a crystalline solid having a melting point of 202 to 205° C. An analytical sample, having a melting point of 206 to 208° C. was obtained by further recrystallization from a mixture of ethyl acetate and Skellysolve B; $[\alpha]_D^{20}$+27° (chloroform).

Anal.—Calcd. for $C_{25}H_{38}O_6$: C, 69.09; H, 8.81. Found: C, 68.94; H, 8.69.

The infrared spectrum of the compound (mineral oil mull) exhibited maxima at 3540, 3430 sh., 1692, 1680, 1653, 1130, 1115, 1090, 1060, 1028 and 1012 reciprocal centimeters.

In the recrystallization of the crude reaction product from acetone as described above, there was isolated, by virtue of its appreciably lower solubility in acetone, a second diol which, after two recrystallizations from acetone, had a melting point of 225 to 227° C. This material was found to be identical to the 3,20-bis(ethylene ketal) of 11α,15α-dihydroxypregn-4-ene-3,20-dione prepared as described in Example 26 below.

Using the above procedure, but replacing the 3,20-bis (ethylene ketal) of 15α-hydroxypregn-4-ene-3,11,20-trione by the corresponding 3,20-bis(2,2-dimethyl-1,2-propylene ketal), 3,20-bis(1,2-propylene ketal) and 3,20-bis (1,3-butylene ketal), there are obtained the corresponding ketals of 11β,15α-dihydrozypregn-4-ene-3,20-dione.

EXAMPLE 10

*11β,15α-Dihydrogypregn-4-ene-3,20-dione*

Using the procedure described in Example 8, but replacing 14α-methyl-11-ketoprogesterone 3,20-bis(ethylene ketal) by the 3,20-bis(ethylene ketal) of 11β,15α-dihydroxypregn-4-ene-3,20-dione there is obtained 11β,15α-dihydroxypregn-4-ene-3,20-dione in the form of a crystalline solid.

Similarly, using the procedure of Example 8, other ketals of 11β,15α-dihydroxypregn-4-ene-3,20-dione such as the 3,20-bis(2,2-dimethyl-1,2-propylene ketal), 3,20-bis(1,2-propylene ketal) and 3,20-bis(1,3-butylene ketal) can be hydrolyzed to yield the free 3,20-dione.

EXAMPLE 11

*3,20-Bis(ethylene ketal) of 11β-hydroxypregn-4-ene-3,15,20-trione*

A solution of 15.7 g. of the 3,20-bis(ethylene ketal) of 11β,15α-dihydroxypregn-4-ene-3,20-dione in 1 liter of toluene was distilled until 200 ml. of distillate had been collected. To the residual dry solution was added 71 g. of redistilled cyclohexanone followed by 22.2 g. of aluminum isopropoxide and the mixture was heated under reflux with stirring for 2 hr. The majority of the solvent was removed by distillation under reduced pressure and the residue was dissolved in a mixture of water and methylene chloride. The mixture was filtered and the insoluble material was washed with methylene chloride. The combined methylene chloride extracts were washed with water, dried over anhydrous sodium sulfate and evaporated to dryness under reduced pressure. The residue was then warmed in vacuo to remove cyclohexylidenecyclohexanone and then recrystallized from ethyl acetate. There was thus obtained 10.7 g. of the 3,20-bis(ethylene ketal) of 11β-hydroxypregn-4-ene-3,15-20-trione having a melting point of 259 to 263° C. An analytical sample having a melting point of 269 to 272° C. was obtained by further recrystallization from ethyl acetate; $[\alpha]_D^{20}$ —14° (chloroform).

Anal.—Calcd. for $C_{25}H_{63}O_6$: C, 69.41; H, 8.39. Found: C, 69.69; H, 8.26.

The infrared spectrum of the compound (mineral oil mull) exhibited maxima at 3500 sh., 1722, 1665 sh., 1158, 1124, 1100, 1090 sh., 1080, 1050 sh., 1045, 1038 sh., 1023, and 1000 reciprocal centimeters.

Using the above procedure, but replacing the 3,20-bis (ethylene ketal) of 11β,15α-dihydroxypregn-4-ene-3,20-dione by the corresponding 3,20-bis(2,2-dimethyl-1,2-propylene ketal) 3,20-bis(1,2-propylene ketal) and 3,20-bis(1,3-butylene ketal), there are obtained the 3,20-bis(2,2-dimethyl-1,2-propylene ketal), 3,20-bis(1,2-propylene ketal) and 3,20-bis(1,3-butylene ketal), respectively, of 11β-hydroxypregn-4-ene-3,15,20-trione.

EXAMPLE 12

*11β-hydroxypregn-4-ene-3,15,20-trione*

Using the procedure described in Example 8, but replacing 14α-methyl-11-ketoprogesterone 3,20-bis(ethylene ketal) by the 3,20-bis(ethylene ketal) of 11β-hydroxypregn-4-ene-3,15,20-trione or the corresponding 3,20-bis(2,2-dimethyl-1,2-propylene ketal), 3,20-bis(1,2-propylene ketal) or 3,20-bis(1,3-butylene ketal), there is obtained 11β-hydroxypregn-4-ene-3,15,20-trione in the form of a crystalline solid.

EXAMPLE 13

*3,20-bis(ethylene ketal) of 15β-hydroxy-14β-pregn-4-ene-3,11,20-trione*

A solution of potassium tert.-butoxide, prepared by dissolving 17.9 g. of potassium in 1.5 l. of tert.-butyl alcohol, was stirred under an atmosphere of nitrogen and 8.3 g. of 11β-hydroxypregn-4-ene-3,15,20-trione was added. The resulting mixture was heated under reflux for 2 hr. and was then evaporated to dryness under reduced pressure. The residue was dissolved in a mixture of water and methylene chloride and the aqueous layer was separated and extracted with methylene chloride. The combined methylene chloride extracts were washed with water, dried over anhydrous sodium sulfate and evaporated to dryness. The residual oil was crystallized by warming with ether and the solid (6.79 g.) so obtained was isolated by filtration and recrystallized twice from ether. There was thus obtained the 3,20-bis(ethylene ketal) of 15β-hydroxy-14β-pregn-4-ene-3,11,20-trione having a melting point of 148 to 150° C.; $[\alpha]_D^{20}$ —133° (chloroform).

Anal.—Calcd. for $C_{25}H_{36}O_6$: C, 69.41; H, 8.39. Found: C, 69.50; H, 8.49.

The infrared spectrum of the compound (mineral oil mull) exhibited maxima at 3440, 1700, 1670, 1095, 1072, 1050, 1034, and 1019 reciprocal centimeters.

Using the procedure described above but replacing the 3,20-bis(ethylene ketal) of 15β-hydroxy-14β-pregn-4-ene-3,11,20-trione by the corresponding 3,20-bis(2,2-dimethyl-1,2-propylene ketal) 3,20-bis(1,2-propylene ketal) or 3,20-bis(1,3-butylene ketal), there are obtained the 3,20-bis(2,2-dimethyl-1,2-propylene ketal), 3,20-bis(1,2-propylene ketal) and 3,20-bis(1,3-butylene ketal), respectively, of 15β-hydroxy-14β-pregn-4-ene-3,11,20-trione.

EXAMPLE 14

*15β-hydroxy-14β-pregn-4-ene-3,11,20-trione*

Using the procedure described in Example 8, but replacing 14α-methyl-11-ketoprogesterone 3,20-bis(ethylene ketal) by the 3,20-bis(ethylene ketal) of 15β-hydroxy-14β-pregn-4-3,11,20-trione or the corresponding 3,20-bis(2,2-dimethyl-1,2-propylene ketal), 3,20-bis(1,2-propylene ketal) or 3,20-bis(1,3-butylene ketal), there is obtained 15β-hydroxy-14β-pregn-4-ene-3,11,20-trione in the form of a crystalline solid.

EXAMPLE 15

*3,20-bis(ethylene ketal) of 14β-pregn-4-ene-3,11,15,20-tetrone*

To a slurry of the complex formed by the careful addition of 7.5 g. of chromium trioxide to 150 ml. of dry pyridine was added 5.3 g. of the 3,20-bis(ethylene ketal) of 15β-hydroxy-14β-pregn-4-ene-3,11,20-trione and the mixture was stirred for several hours at approximately 25° C. The resulting mixture was poured into 500 ml. of a mixture of equal parts of benzene and ethyl acetate. The suspension so obtained was filtered and the insoluble material was washed on the filter with the same solvent mixture. The filtrate and washings were combined and washed with water before being dried over anhydrous sodium sulfate and evaporated to dryness under reduced pressure. The residue (5.6 g.) was recrystallized from ether. There was thus obtained the 3,20-bis(ethylene ketal) of 14β-pregn-4-ene-3,11,15,20-tetrone in the form of a crystalline solid having a melting point of 165 to 166° C.

Anal.—Calcd. for $C_{25}H_{34}O_6$: C, 69.74; H, 7.96. Found: C, 69.76; H, 8.07.

Using the above procedure, but replacing the 3,20-bis (ethylene ketal) of 15β-hydroxy-14β-pregn-4-ene-3,11,20-trione by the corresponding 3,20-bis(2,2-dimethyl-1,2-propylene ketal), 3,20-bis(1,2-propylene ketal) or 3,20-bis(1,3-butylene ketal), there are obtained the 3,20-bis (2,2-dimethyl-1,2-propylene ketal), 3,20-bis(1,2-propylene ketal), and 3,20-bis(1,3-butylene ketal), respectively, of 14β-pregn-5-ene-3,11,15,20-tetrone.

EXAMPLE 16

*14β-pregn-4-ene-3,11,15,20-tetrone*

Using the procedure described in Example 8, but replacing 14α-methyl-11-ketoprogesterone 3,20-bis(ethylene ketal) by the 3,20-bis(ethylene ketal) of 14β-pregn-4-ene-3,11,15,20-tetrone or the corresponding 3,20-bis(2,2-dimethyl-1,2-propylene ketal), 3,20-bis(1,2-propylene ketal) or 3,20-bis (1,3-butylene ketal), there is obtained 14β-pregn-4-ene-3,11,15,20-tetrone.

EXAMPLE 17

*3,20-bis(ethylene ketal) of pregn-4-ene-3,11,15,20-tetrone*

A solution of 100 mg. of the 3,20-bis(ethylene ketal) of 14β-pregn-4-ene-3,11,15,20-tetrone in 10 ml. of methanol was treated with 2 ml. of a 5 percent aqueous solution of potassium hydroxide and the solution was warmed on a steam bath for a short period. The solvent was then removed by distillation under reduced pressure and the residue was extracted with methylene chloride. The methylene chloride extract was washed with water, dried over anhydrous sodium sulfate, and evaporated to dryness. The residue (95 mg.) was crystallized from a mixture of acetone and Skellysolve B to give the 3,20-bis(ethylene ketal) of pregn-4-ene-3,11,15,20-tetrone having a melting point of 212 to 214° C., undepressed by admixture with the compound prepared as described in Example 2.

EXAMPLE 18

*3,20-bis(ethylene ketal) of 14α-methylpregn-4-ene-3,11, 15,20-tetrone*

Using the procedure described in Example 3, but replacing the 3,20-bis(ethylene ketal) of pregn-4-ene-3,11,15,20-tetrone by the 3,20-bis(ethylene ketal) of 14β-pregn-4-ene-3,11,15,20-tetrone there is prepared the 3,20-bis (ethylene ketal) of 14α-methylpregn-4-ene-3,11,15,20-tetrone.

EXAMPLE 19

*3,20-bis(ethylene ketal) of 15-hydroxy-14α-methylpregn-4-ene-3,11,20-trione*

A solution of 1.45 g. of the 3,20-bis(ethylene ketal) of 14α-methylpregn-4-ene-3,11,15,20-tetrone in 150 ml. of dioxane (which had been freshly pressured through a bed of activated alumina to remove peroxides) was stirred and treated with 3 g. of sodium borohydride in 20 ml. of water. The mixture was stirred for several hours at approximately 25° C. before being made slightly acid by the addition of 50 percent aqueous acetic acid. The resulting mixture was distilled under reduced pressure to remove dioxane. The residue was filtered and the solid so recovered was dried in vacuo. There was thus obtained 1.15 g. of a mixture of the 15α- and 15β-epimers of the 3,20-bis(ethylene ketal) of 15-hydroxy-14α-methylpregn-4-ene-3,11,20-trione in the form of a solid having a melting point of 226 to 229° C. This material was used without further purification in the process of Example 21.

Anal.—Calcd. for $C_{26}H_{38}O_6$: C, 69.92; H, 8.58. Found: C, 69.72; H, 8.60.

The pure 15α- and 15β-epimers of the 3,20-bis(ethylene ketal) of 15-hydroxy-14α-methylpregn-4-ene-3,11,20-trione can be obtained from the above mixture by subjecting the latter to chromatography on a column of magnesium silicate, eluting the column with Skellysolve B containing increasing proportions of acetone and combining and evaporating those fractions which, on the basis of infrared analysis and paper chromatographic analysis, contained the desired materials.

Using the above procedure, but replacing the 3,20-bis (ethylene ketal) of 14α-methylpregn-4-ene-3,11,20-tetrone by the corresponding 3,20-bis(2,2-dimethyl-1,2-propylene ketal), 3,20-bis(1,2-propylene ketal) or 3,20-bis(1,3-butylene ketal), there are obtained the 15α- and 15β-epimers of the 3,20-bis(2,2-dimethyl-1,2-propylene ketal), 3,20-bis (1,2-propylene ketal), and 3,20-bis(1,3-butylene ketal), respectively, of 15-hydroxy-14α-methylpregn-4-ene-3,11, 20-trione.

EXAMPLE 20

*15-hydroxy-14α-methylpregn-4-ene-3,11,20-trione*

Using the procedure described in Example 8, but replacing 14α-methyl-11-ketoprogesterone 3,20-bis(ethylene ketal) by the 15α- or 15β-epimer of the 3,20-bis(ethylene ketal) of 15-hydroxy-14α-methylpregn-4-ene-3,11,20-trione there are obtained the 15α- and 15β-epimers of 15-hydroxy-14α-methyl-pregn-4-3,11,20-trione.

EXAMPLE 21

*3,20-bis(ethyleneketal) of 15-tosyloxy-14α-methylpregn-4-ene-3,11,20-trione*

A mixture of 5 g. of the mixture of 15α- and 15β-epimers of the 3,20-bis(ethylene ketal) of 15-hydroxy-14α-methylpregn-ene-3,11,20-trione prepared as described in Example 19, 20 ml. of dry pyridine and 3.75 g. of toluene-p-sulfonyl chloride is allowed to stand for several hours at approximately 25° C. The resulting mixture is poured into water and extracted thoroughly with methylene chloride. The methylene chloride extracts are combined, washed with water, and dried over anhydrous sodium sulfate. The dried solution is filtered and the filtrate is evaporated to dryness under reduced pressure. The residue is dissolved in methylene chloride and chromatographed over magnesium silicate (Florisil). The column is eluted with Skellysolve B containing increasing proportions of acetone and those fractions which, on the basis of infrared and paper chromatographic analysis, are found to contain the desired product, are combined and evaporated to dryness. There are thus obtained the 15α- and 15β-epimers of the 3,20-bis(ethylene ketal) of 15-tosyloxy-14α-methylpregn-4-ene-3,11,20-trione.

Using the above procedure, but replacing the 15α- or 15β-epimers of the 3,20-bis(ethylene ketal) of 15-hydroxy-14α-methylpregn-4-ene-3,11,20-trione by the corresponding 3,20-bis(2,2-dimethyl-1,2-propylene ketal), 3,20-bis (1,2-propylene ketal) or 3,20-bis(1,3-butylene ketal), there are obtained the 15α- and 15β-epimers of the 3,20-bis(2,2-dimethyl-1,2-propylene ketal), 3,20-bis(1,2-propylene ketal), and 3,20-bis(1,3-butylene ketal), respectively, of 15-tosyloxy-14α-methylpregn-4-ene-3,11,20-trione.

EXAMPLE 22

*3,20-bis(ethylene ketal) of 11β-hydroxy-14α-methylpregn-4-ene-3,20-dione*

To a stirred solution of 1.65 g. of lithium aluminum hydride in 100 ml. of purified tetrahydrofuran at approximately 25° C. is added dropwise, with stirring and cooling, a solution of 3 g. of the 3,20-bis(ethylene ketal) of 15β- tosyloxy-14α-methylpregn-4-ene-3,11,20-trione in 120 ml. of tetrahydrofuran. When the addition is complete the reaction mixture is heated under reflux with stirring to complete the reaction. The resulting mixture is cooled in ice and the excess reducing agent is destroyed by the careful addition of ethyl acetate. The mixture is then treated with excess aqueous sodium sulfate and filtered. The organic phase of the filtrate is separated and the aqueous phase is extracted with methylene chloride. The combined organic layer and methylene chloride extract is evaporated to dryness under reduced pressure. The residue is dissolved in a mixture of methylene chloride and water and the methylene chloride phase is separated, washed with water and dried over anhydrous sodium sulfate. The dried solution is filtered and the filtrate is evaporated to dryness under reduced pressure. The residue is chromatographed on a column of magnesium silicate (Florisil) and the column is eluted with Skellysolve B containing increasing proportions of acetone. Those fractions which show no absorption in the infrared corresponding to carbonyl or tosyloxy groups are combined and evaporated to dryness. The residue is recrystallized from a mixture of acetone and Skellysolve B. There is obtained the 3,20-bis(ethylene ketal) of 11β-hydroxy-14α-methylpregn-4-ene-3,20-dione.

Using the above procedure, but replacing the 3,20-bis(ethylene ketal) of 15β-tosyloxy-14α-methylpregn-4-ene-3,11,20-trione by the corresponding 3,20-bis(2,2-dimethyl-1,2-propylene ketal), 3,20-bis(1,2-propylene ketal), or 3,20-bis(1,3-butylene ketal), there are obtained the 3,20-bis(2,2-dimethyl-1,2-propylene ketal), 3,20-bis(1,2-propylene ketal) and 3,20-bis(1,3-butylene ketal), respectively, of 11β-hydroxy-14α-methylpregn-4-ene-3,11,20-trione.

EXAMPLE 23

*11β-hydroxy-14-α-methylpregn-4-ene-3,11,20-trione*

Using the procedure described in Example 8, but replacing 14α-methyl-11-ketoprogesterone 3,20-bis-(ethylene ketal) by the 3,20-bis(ethylene ketal) of 11β-hydroxy-14α-methylpreg-4-ene-3,11,20-trione or the corresponding 3,20-bis(2,2-dimethyl-1,2-propylene ketal), 3,20-bis(1,2-propylene ketal), or 3,20-bis(1,3-butylene ketal), there is obtained 11β-hydroxy-14α-methylpregn-4-ene-3,11,20-trione.

EXAMPLE 24

*14α-methyl-11-ketoprogesterone 3,20-bis(ethylene ketal)*

A solution of 1 g. of the 3,20-bis(ethylene ketal) of 11β-hydroxy-14α-methylpregn-4-ene-3,20-dione in 20 ml. of pyridine is added to a slurry of the complex resulting from the addition of 1 g. of chromium trioxide to 10 ml. of pyridine and the mixture is allowed to stand for 24 hrs. at approximately 25° C. To the reaction mixture is then added 100 ml. of a mixture of equal parts of benzene and ethyl acetate and the mixture is stirred well and then filtered. The filtrate is washed with water and then evaporated to dryness and the residue is recrystallized from a mixture of Skellysolve B and acetone. There is thus obtained the 3,20-bis(ethylene ketal) of 14α-methyl-11-ketoprogesterone in the form of a crystalline solid identical in all respects to the compound prepared as described in Example 7.

Using the above procedure, but replacing the 3,20-bis(ethylene ketal) of 11β-hydroxy-14a-methylpregn-4-ene-3,20-dione by the corresponding 3,20-bis(2,2-dimethyl-1,2-propylene ketal), 3,20-bis(1,2-propylene ketal), or 3,20-bis(1,3-butylene ketal), there are obtained the 3,20-bis(2,2-dimethyl-1,2-propylene ketal), 3,20-bis(1,2-propylene ketal), and 3,20-bis(1,3-butylene ketal), respectively, of 14α-methyl-11-ketoprogesterone.

EXAMPLE 25

*14α-methyl-11-ketoprogesterone*

Using the procedure described in Example 24, but replacing the 3,20-bis(ethylene ketal) of 11β-hydroxy-14α-methylpregn-4-ene-3,20-dione by 11β-hydroxy-14α-methyl-pregn-4-ene-3,20-dione, there is obtained 14α-methyl-11-ketoprogesterone in the form of a crystalline solid identical in all respects with the material obtained as described in Example 8.

EXAMPLE 26

*3,20-bis(ethylene ketal) of 11α,15α-dihydroxypregn-4-ene-3,20-dione*

A solution of 4.32 g. of the 3,20-bis(ethylene ketal) of 15α-hydroxypregn-4-ene-3,11,20-trione in a mixture of 12 ml. of ethanol and 40 ml. of dry purified dioxan was prepared by gentle warming. The resulting solution was cooled and cautiously added with stirring to 600 ml. of anhydrous liquid ammonia. The mixture so obtained was stirred vigorously and 4.6 g. of sodium metal was added portionwise, addition of each portion being made when the blue color produced by the addition of the previous portion had disappeared. When the addition was complete, the excess ammonia was removed by evaporation on the steam bath, and the residue was diluted with water. The resulting mixture was extracted thoroughly with chloroform and the chloroform extracts were combined and washed with water until the washings were neutral. The washed chloroform solution was dried over anhydrous sodium sulfate and filtered. The filtrate was evaporated to dryness under reduced pressure and the residue (4.4 g.) was recrystallized from acetone. There was thus obtained the 3,20-bis(ethylene ketal) of 11α,15α-dihydroxypregn-4-ene-3,20-dione in the form of a crystalline solid having a melting point of 224 to 227° C.

*Anal.*—Calcd. for $C_{25}H_{38}O_6$: C, 69.09; H, 8.81. Found: C, 69.37; H, 9.02.

Using the above procedure, but replacing the 3,20-bis(ethylene ketal) of 11α,15α-dihydroxypregn-4-ene-3,20-dione by the corresponding 3,20-bis(2,2-dimethyl-1,2-propylene ketal), 3,20-bis(1,2-propylene ketal) or 3,20-bis(1,3-butylene ketal), there are obtained the 3,20-bis(2,2-dimethyl-1,2-propylene ketal), 3,20-bis(1,2-propylene ketal), and 3,20-bis(1,3-butylene ketal), respectively, of 11α,15α-dihydroxypregn-4-ene-3,20-dione.

EXAMPLE 27

*11α,15α-dihydroxypregn-4-ene-3,20-dione*

Using the procedure described in Example 8, but replacing 14α-methyl-11-ketoprogesterone 3,20-bis(ethylene ketal) by the 3,20-bis(ethylene ketal) of 11α,15α-dihydroxypregn-4-ene-3,20-dione or the corresponding 3,20-bis(2,2-dimethyl-1,2-propylene ketal), 3,20-bis(1,2-propylene ketal), or 3,20-bis(1,3-butylene ketal), there is obtained 11α,15α-dihydroxypregn-4-ene-3,20-dione.

EXAMPLE 28

*11α-hydroxypregn-4-ene-3,15,20-trione 3,20-bis(ethylene ketal)*

Using the procedure described in Example 11, but replacing the 3,20-bis(ethylene ketal) of 11β,15α-dihydroxypregn-4-ene-3,20-dione by the 3,20-bis(ethylene ketal) of 11α,15α-dihydroxypregn-4-ene-3,20-dione there is obtained 11α-hydroxypregn-4-ene-3,15,20-trione 3,20-bis(ethylene ketal) in the form of a crystalline solid.

Using the same procedure other ketals of 11α,15α-dihydroxypregn-4-ene-3,20-dione such as the 3,20-bis(2,2-dimethyl-1,2-propylene ketal), 3,20-bis(1,2-propylene ketal), and 3,20-bis(1,3-butylene ketal), are oxidized to the corresponding ketals of 11α-hydroxypregn-4-ene-3,15,20-trione.

EXAMPLE 29

*11α-hydroxypregn-4-ene, 3,15,20-trione*

Using the procedure described in Example 8, but replacing 14α-methyl-11-ketoprogesterone 3,20-bis(ethylene ketal) by the 3,20-bis(ethylene ketal) of 11α-hydroxypregn-4-ene-3,15,20-trione or the corresponding 3,20-bis(2,2-dimethyl-1,2,-propylene ketal), or 3,20-bis(1,3-butylene ketal), there is obtained 11α-hydroxypregn-4-ene-3,15,20-trione.

EXAMPLE 30

*3,20-bis(ethylene ketal) of 11α,15β-dihydroxy-14β-pregn-4-ene-3,20-dione*

Using the procedure described in Example 26, but replacing the 3,20-bis(ethylene ketal) of 15α-hydroxypregn-4-ene-3,11,20-trione by the 3,20-bis(ethylene ketal) of 15β-hydroxy-14β-pregn-4-ene-3,11,20-trione (prepared as described in Example 13), there is obtained the 3,20-bis (ethylene ketal) of 11α,15β-dihydroxy-14β-pregn-4-ene-3,20-dione.

Using the same procedure, other ketals of 15β-hydroxy-14β-pregn-4-ene-3,11,20-trione, such as the 3,20-bis(2,2-dimethyl-1,2-propylene ketal), 3,20-bis(1,2-propylene ketal) and 3,20-bis(1,3-butylene ketal) are oxidized to the corresponding ketals of 11α,15β-dihydroxy-14β-pregn-4-ene-3,20-dione.

EXAMPLE 31

*11α,15β-dihydroxy-14β-pregn-4-ene-3,20-dione*

Using the procedure described in Example 8, but replacing 14α-methyl-11-ketoprogesterone 3,20-bis(ethylene ketal) by the 3,20-bis(ethylene ketal) of 11α,15β-dihydroxy-14β-pregn-4-ene-3,20-dione or the corresponding 3,20-bis(2,2-dimethyl-1,2-propylene ketal), 3,20-bis(1,2-propylene ketal), or 3,20-bis(1,3-butylene ketal), there is obtained 11α,15β-dihydroxy-14β-pregn-4-ene-3,20-dione in the form of a crystalline solid.

EXAMPLE 32

*3,20-bis(ethylene ketal) of 11α-hydroxypregn-4-ene-3,15,20-trione*

Using the procedure described in Example 11, but replacing the 3,20-bis(ethylene ketal) of 11β,15α-dihydroxypregn-4-ene-3,20-dione by the 3,20-bis(ethylene ketal) of 11α,15β-dihydroxy-14β-pregn-4-ene-3,20-dione there is obtained the 3,20-bis(ethylene ketal) of 11α-hydroxypregn-4-ene-3,15,20-trione in the form of a crystalline solid.

Using the same procedure, other ketals of 11α,15β-dihydoxy-14β-pregn-4-ene-3,20-dione such as the 3,20-bis(2,2-dimethyl-1,2-propylene ketal), 3,20-bis(1,2-propylene ketal), and 3,20-bis(1,3-butylene ketal), are oxidized to the corresponding ketals of 11α-hydroxypregn-4-ene-3,15-20-trione.

EXAMPLE 33

*3,20-bis(ethylene ketal) of 11α-hydroxy-14α-methylpregn-4-ene-3,15,20-trione*

Using the procedure described in Example 3, but replacing the 3,20-bis(ethylene ketal) of pregn-4-ene-3,11,15,20-tetrone by the 3,20-bis(ethylene ketal) of 11α-hydroxypregn-4-ene-3,15,20-trione there is obtained the 3,20-bis(ethylene ketal) of 11α-hydroxy-14α-methylpregn-4-ene-3,15,20-trione in the form of a crystalline solid.

Similarly, using the above procedure, other ketals of 11α-hydroxypregn-4-ene-3,15,20-trione, such as the 3,20-bis(2,2-dimethyl-1,2-propylene ketal), 3,20-bis(1,2-propylene ketal) and 3,20-bis(1,3-butylene ketal), can be converted to the corresponding ketals of 11α-hydroxy-14α-methylpregn-4-ene-3,15,20-trione.

EXAMPLE 34

*11α-hydroxy-14α-methylpregn-4-ene-3,15,20-trione*

Using the procedure described in Example 8, but replacing 14α-methyl-11-ketoprogesterone 3,20-bis(ethylene ketal) by the 3,20-bis(ethylene ketal) of 11α-hydroxy-14α-methylpregn-4-ene-3,15,20-trione or the corresponding 3,20-bis(2,2-dimethyl-1,2-propylene ketal), 3,20-bis(1,2-propylene ketal), or 3,20-bis(1,3-butylene ketal), there is obtained 11α-hydroxy-14α-methylpregn-4-ene-3,15,20-trione.

EXAMPLE 35

*3,20-bis(ethylene ketal) of 11α-hydroxy-14α-methylpregn-4-ene-3,20-dione*

Using the procedure described in Example 7, but replacing the 3,20-bis(ethylene ketal) of 14α-methylpregn-4-ene-3,11,15,20-tetrone by the 3,20-bis(ethylene ketal) of 11α-hydroxy-14α-methylpregn-4-ene-3,15,20-trione there is obtained the 3,20-bis(ethylene ketal) of 11α-hydroxy-14α-methylpregn-4-ene-3,20-dione in the form of a crystalline solid.

Using the same procedure, other ketals of 11α-hydroxy-14α-methylpregn-4-ene-3,15,20-trione, such as the 3,20-bis(2,2-dimethyl-1,2-propylene ketal), 3,20-bis(1,2-propylene ketal), and 3,20-bis(1,3-butylene ketal) are converted to the corresponding ketals of 11α-hydroxy-14α-methylpregn-4-ene-3,20-dione.

EXAMPLE 36

*11α-hydroxy-14α-methylpregn-4-ene-3,20-dione*

Using the procedure described in Example 8, but replacing 14α-methyl-11-ketoprogesterone 3,20-bis(ethylene ketal) by the 3,20-bis(ethylene ketal) of 11α-hydroxy-14α-methylpregn-4-ene-3,20-dione or the corresponding 3,20-bis(2,2-dimethyl-1,2-propylene ketal), 3,20-bis(1,2-propylene ketal), or 3,20-bis(1,3-butylene ketal), there is obtained 11α-hydroxy-14α-methylpregn-4-ene-3,20-dione in the form of a crystalline solid.

EXAMPLE 37

*14α-methyl-11-ketoprogesterone 3,20-bis(ethylene ketal)*

Using the procedure described in Example 24, but replacing the 3,20-bis(ethylene ketal) of 11β-hydroxy-14α-methylpregn-4-ene-3,20-dione by the 3,20-bis(ethylene ketal) of 11α-hydroxy-14α-methylpregn-4-ene-3,20-dione, there is obtained the 3,20-bis(ethylene ketal) of 14α-methyl-11-ketoprogesterone in the form of a crystalline solid.

Using the same procedure, other ketals of 11α-hydroxy-14α-methylpregn-4-ene-3,20-dione such as the 3,20-bis(2,2-dimethyl-1,2-propylene ketal), 3,20-bis(1,2-propylene ketal), or 3,20-bis(1,3-butylene ketal), are oxidized to the corresponding ketals of 14α-methyl-11-ketoprogesterone.

EXAMPLE 38

*14α-methyl-11-ketoprogesterone*

Useing the procedure described in Example 24, but replacing 11β-hydroxy-14α-methylpregn-4-ene-3,20-dione by 11α-hydroxy-14α-methylpregn-4-ene-3,20-dione, there is obtained 14α-methyl-11-ketoprogesterone.

I claim:

1. In a process for the preparation of 14α-methyl-11-ketoprogesterone, the combination of steps comprising oxidizing 15α-hydroxypregn-4-ene-3,11,20-trione 3,20-bis-(alkylene ketal), wherein the alkylene radical contains from 2 to 6 carbon atoms, inclusive, and the attaching oxygen to carbon bonds of the alkylene ketal group are separated by a chain of from 2 to 3 carbon atoms, inclusive, to produce the corresponding 3,20-bis(alkylene ketal) of pregn-4-en-3,11,15,20-tetrone, methylating the latter compound by reaction with a methyl halide in the presence of an alkali metal alkoxide to produce the corresponding 3,20-bis(alkylene ketal) of 14α-methylpregn-4-ene-3,11,15,20-tetrone, heating the latter compound with hydrazine in the presence of an alkali metal hydroxide and an inert organic solvent and hydrolyzing the 3,20-bis(alkylene ketal) of 14α-methyl-11-ketoprogesterone so obtained to yield 14α-methyl-11-ketoprogesterone.

2. A process which comprises reacting a 3,20-bis(alkylene ketal) of pregn-4-ene-3,11,15,20-tetrone wherein the alkylene radical contains from 2 to 6 carbon atoms, inclusive, and the attaching oxygen to carbon bonds of the alkylene ketal group are separated by a chain of from 2 to 3 carbon atoms, inclusive, with a methyl halide in the presence of an alkali metal alkoxide to produce the corresponding 3,20-bis(alkylene ketal) of 14α-methylpregn-4-ene-3,11,15,20-tetrone.

3. A process which comprises reacting a 3,20-bis(alkylene ketal) of 14α-methylpregn-4-ene-3,11,15,20-tetrone, wherein the alkylene radical contains from 2 to 6 carbon atoms, inclusive, and the attaching oxygen to carbon bonds of the alkylene ketal group are separated by a chain of from 2 to 3 carbon atoms, inclusive, with hydrazine in the presence of an alkali metal hydroxide and an inert organic solvent at a temperature of the order of 200° C. to obtain the corresponding 3,20-bis(alkylene ketal) of 14α-methyl-11-ketoprogesterone.

4. In the process for the preparation of a 3,20-bis(alkylene ketal) of 14α-methylpregn-4-ene-3,11,15,20-tetrone wherein the alkylene radical contains from 2 to 6 carbon atoms, inclusive, and the attaching oxygen to carbon bonds of the alkylene ketal group are separated by a chain of from 2 to 3 carbon atoms, inclusive, the steps comprising reducing the corresponding 3,20-bis(alkylene ketal) of 15α-hydroxypregn-4-ene-3,11,20-trione using a reducing agent selected from the class consisting of alkali metal aluminum hydrides and alkali metal borohydrides in the presence of an inert organic solvent to obtain the corresponding 3,20-bis(alkylene ketal) of 11β,15α-dihydroxypregn-4-ene-3,20-dione selectively oxidizing the latter compound by treatment with aluminum isopropoxide in the presence of a ketone and an inert solvent to produce the corresponding 3,20-bis(alkylene ketal) of 11β-hydroxypregn-4-ene-3,15,20-trione, isomerizing the latter compound in the presence of a base to yield the corresponding 3,20-bis(alkylene ketal) of 15β-hydroxy-14β-pregn-4-ene-3,11,20-trione, oxidizing the latter compound to yield the corresponding 3,20-bis(alkylene ketal) of 14β-pregn-4-ene-3,11,15,20-tetrone and reacting the latter compound with a methyl halide in the presence of an alkali metal alkoxide to produce the corresponding 3,20-bis(alkylene ketal) of 14α-methylpregn-4-ene-3,11,15,20-tetrone.

5. The process which comprises reducing a 3,20-bis(alkylene ketal) of 15α-hydroxypregn-4-ene-3,11,20-trione, wherein the alkylene radical contains from 2 to 6 carbon atoms, inclusive, and the attaching oxygen to carbon bonds of the alkylene ketal group are separated by a chain of from 2 to 3 carbon atoms, inclusive, using a reducing agent selected from the class consisting of alkali metal aluminum hydrides and alkali metal borohydrides, in the presence of an inert organic solvent to obtain the corresponding 3,20-bis(alkylene ketal) of 11β,15α-dihydroxypregn-4-ene-3,20-dione.

6. The process which comprises oxidizing a 3,20-bis(alkylene ketal) of 11β,15α-dihydroxypregn-4-ene-3,20-dione wherein the alkylene radical contains from 2 to 6 carbon atoms, inclusive, and the attaching oxygen to carbon bonds of the alkylene ketal group are separated by a chain of from 2 to 3 carbon atoms, inclusive, using aluminum isopropoxide in the presence of an aliphatic ketone and an inert solvent to produce the corresponding 3,20-bis(alkylene ketal) of 11β-hydroxypregn-4-ene-3,15,20-trione.

7. The process which comprises isomerizing a 3,20-bis-(alkylene ketal) of 11β-hydroxypregn-4-ene-3,15,20-trione wherein the alkylene radical contains from 2 to 6 carbon atoms, inclusive, and the attaching oxygen to carbon bonds of the alkylene ketal group are separated by from 2 to 3 carbon atoms, inclusive, by reacting the above compound with a base in the presence of an inert organic solvent to obtain the corresponding 3,20-bis(alkylene ketal) of 15β-hydroxy-14β-pregn-4-ene-3,11,20-trione.

8. The process which comprises reacting a 3,20-bis(alkylene ketal) of 14β-pregn-4-ene-3,11,15,20-tetrone wherein the alkylene radical contains from 1 to 8 carbon atoms, inclusive, and the attaching oxygen to carbon bonds of the alkylene ketal group are separated by from 2 to 3 carbon atoms, inclusive, with a methyl halide in the presence of an alkali metal alkoxide and an inert organic solvent to obtain the corresponding 3,20-bis(alkylene ketal) of 14α-methylpregn-4-ene-3,11,15,20-tetrone.

9. In a process for the preparation of 14α-methyl-11-ketopregesterone the steps comprising selectively reducing the 15-keto group in a 3,20-bis(alkylene ketal) of 14α-methylpregn-4-ene-3,11,15,20-tetrone, wherein the alkylene radical contains from 2 to 6 carbon atoms, inclusive, and the attaching oxygen to carbon bonds of the alkylene ketal group are separated by from 2 to 3 carbon atoms, inclusive, by reacting the latter compound with an alkali metal borohydride in the presence of an inert organic solvent, treating the 3,20-bis(alkylene ketal) of 15-hydroxy-14α-methylpregn-4-ene-3,11,20-trione so obtained with a sulfonacylating agent selected from the class consisting of alkylsulfonyl halides and arylsulfonyl halides in the presence of a tertiary amine to produce the corresponding 3,20-bis(alkylene ketal) of 15-sulfonacyloxy-14α-methylpregn-4-ene-3,11,20-trione reacting the latter compound with lithium aluminum hydride in presence of an inert solvent to obtain the corresponding 3,20-bis(alkylene ketal) of 11β-hydroxy-14α-methylpregn-4-ene-3,20-dione and subjecting the latter compound to oxidation and acid hydrolysis in either order, to obtain 14α-methyl-11-ketoprogesterone.

10. In a process for the preparation of 14α-methyl-11-ketoprogesterone the steps comprising reducing a 3,20-bis-(alkylene ketal) of 15α-hydroxypregn-4-ene-3,11,20-trione wherein the alkylene radical contains from 2 to 6 carbon atoms, inclusive, and the attaching oxygen to carbon bonds of the alkylene ketal group are separated by from 2 to 3 carbon atoms, inclusive, using sodium and a lower alkanol in the presence of liquid ammonia to obtain the corresponding 3,20-bis(alkylene ketal) of 11α,15α-dihydroxypregn-4-ene-3,20-dione, selectively oxidizing the 15α-hydroxy group of the latter compound by reaction with aluminum isproproxide in the presence of an alpihatic ketone and an inert solvent to obtain the corresponding 3,20-bis(alkylene ketal) of 11α-hydroxypregn-4-ene-3,15,20-trione reacting the latter compound with a methyl halide in the presence of an alkali metal alkoxide to produce the corresponding 3,20-bis(alkylene ketal) of 11α-hydroxy-14α-methylpregn-4-ene-3,15,20-trione, heating the latter compound with hydrazine in the presence of an alkali metal hydroxide and an inert organic solvent and subjecting the corresponding 3,20-bis(alkylene ketal) of 11α-hydroxy-14α-methylpregn-4-ene-3,20-dione to oxidation and acid hydrolysis, in either order, to obtain 14α-methyl-11-ketoprogesterone.

11. 3,20-bis(ethylene ketal) of 11α-hydroxy-14α-methylpregn-4-ene-3,15,20-trione.

12. 3,20-bis(ethylene ketal) of 11β,15α-dihydroxypregn-4-ene-3,20-dione.

13. 3,20-bis(ethylene ketal) of 11β-hydroxpregn-4-ene-3,15,20-trione.

14. 3,20-bis(ethylene ketal) of 11α,15α-dihydroxypregn-4-ene-3,20-dione.

15. 3,20-bis(ethylene ketal) of 11α-hydroxypregn-4-ene-3,15,20-trione.

References Cited in the file of this patent
UNITED STATES PATENTS

| | | |
|---|---|---|
| 2,700,666 | Bernstein | Jan. 25, 1955 |
| 2,838,501 | Campbell | June 10, 1958 |
| 2,960,435 | Donin et al. | Nov. 15, 1960 |
| 3,021,327 | Beal et al. | Feb. 13, 1962 |
| 3,038,910 | Fried et al. | June 12, 1962 |
| 3,053,864 | Beal et al. | Sept. 11, 1962 |

FOREIGN PATENTS

| | | |
|---|---|---|
| 739,597 | Great Britain | Nov. 2, 1955 |

UNITED STATES PATENT OFFICE
CERTIFICATE OF CORRECTION

Patent No. 3,166,550                      January 19, 1965

Brian Bannister

It is hereby certified that error appears in the above numbered patent requiring correction and that the said Letters Patent should read as corrected below.

Column 5, line 63, for "1046" read -- 1946 --; column 9, line 27, after "for" insert -- 6 --; line 50, for "ketal, 2,30-bis" read -- ketal), 3,20-bis --; column 13, line 33, for "dihydrozypregn-" read -- dihydroxypregn- --; line 36, for "-Dihydrogypregn-", in italics, read -- -Dihydroxypregn- --, in italics; column 16, line 18, for "-3,11,20-tetrone" read -- -3,11,15,20-tetrone --; line 34, for "-4-3,11,20" read -- -4-ene-3,11,20 --; line 37, for "(ethyleneketal), in italics, read -- (ethylene ketal) --, in italics; same column 16, line 41, for "methylpregn-enp-" read -- methylpregn-4-ene- --; column 17, line 35, for "-hydroxy-14-α-", in italics, read -- -hydroxy-14α- --, in italics; line 40, for "methylpreg" read -- methylpregn --; column 20, line 48, for "Useing" read -- Using --; line 61, for "-4-en-3,11,15,20-" read ---4-ene-3,11,15,20- --; column 22, line 38, for "isproproxide" read -- isopropoxide --; same line 38, for "alpihatic" read -- aliphatic --.

Signed and sealed this 7th day of December 1965.

(SEAL)
Attest:

ERNEST W. SWIDER                      EDWARD J. BRENNER
Attesting Officer                    Commissioner of Patents